United States Patent
Valdes

(10) Patent No.: US 9,728,955 B2
(45) Date of Patent: Aug. 8, 2017

(54) ZONE SELECTIVE INTERLOCKING (ZSI) POWER DISTRIBUTION OPERATING A ZSI POWER DISTRIBUTION SYSTEM

(71) Applicant: GENERAL ELECTRIC COMPANY, Schenectady, NY (US)

(72) Inventor: Marcelo Esteban Valdes, Burlington, CT (US)

(73) Assignee: General Electric Company, Schenectady, NY (US)

(*) Notice: Subject to any disclaimer, the term of this patent is extended or adjusted under 35 U.S.C. 154(b) by 753 days.

(21) Appl. No.: 14/103,524

(22) Filed: Dec. 11, 2013

(65) Prior Publication Data

US 2015/0162741 A1 Jun. 11, 2015

(51) Int. Cl.
| | |
|---|---|
| *H02H 7/30* | (2006.01) |
| *H02H 7/26* | (2006.01) |
| *H02H 3/08* | (2006.01) |
| *H02H 3/44* | (2006.01) |

(52) U.S. Cl.
CPC ............ *H02H 7/30* (2013.01); *H02H 3/08* (2013.01); *H02H 3/44* (2013.01); *H02H 7/262* (2013.01); *H02H 7/263* (2013.01)

(58) Field of Classification Search
CPC  H02H 7/30; H02H 7/263; H02H 3/08; H02H 3/44; H02H 7/262
See application file for complete search history.

(56) References Cited

U.S. PATENT DOCUMENTS

| | | | | |
|---|---|---|---|---|
| 4,644,438 | A | * | 2/1987 | Puccinelli ................ H02H 3/07 361/75 |
| 5,295,035 | A | * | 3/1994 | Nishijima ................ H02H 7/30 361/61 |
| 5,875,088 | A | | 2/1999 | Matsko |
| 5,905,615 | A | | 5/1999 | Rivetti et al. |
| 6,137,665 | A | * | 10/2000 | Boudaud ................. H02H 7/30 361/63 |
| 6,295,190 | B1 | | 9/2001 | Rinaldi et al. |
| 6,297,939 | B1 | | 10/2001 | Bilac et al. |
| 6,313,975 | B1 | | 11/2001 | Dunne et al. |

(Continued)

OTHER PUBLICATIONS

Power Product Switchgear, 2012, pp. 2-22.

(Continued)

*Primary Examiner* — Zeev V Kitov
(74) *Attorney, Agent, or Firm* — General Electric Company

(57) ABSTRACT

Power distribution systems and methods are described. In one example, a method of determining by a first circuit protection device in a zone selective interlocking (ZSI) system whether to output a blocking signal to a second circuit protection device in the ZSI system is described. The method includes detecting, by a current rate of change sensor, a rate of change of a current flowing through the first circuit protection device. A trip unit receives a current rate of change signal from the current rate of change sensor. The current rate of change signal is proportional to the detected rate of change of the current flowing through the first circuit protection device. The trip unit determines whether to output the blocking signal to the second circuit protection device based, at least in part, on the current rate of change signal.

20 Claims, 2 Drawing Sheets

(56) References Cited

U.S. PATENT DOCUMENTS

| | | |
|---|---|---|
| 7,570,471 B2 | 8/2009 | Weiher et al. |
| 8,014,115 B2 | 9/2011 | Vicente et al. |
| 8,207,742 B2 | 6/2012 | Sawhney et al. |
| 8,280,653 B2 | 10/2012 | Lagree |
| 8,355,230 B2 | 1/2013 | Culligan et al. |
| 8,390,973 B2 | 3/2013 | Vicente et al. |
| 2009/0109589 A1 | 4/2009 | Yoo et al. |

OTHER PUBLICATIONS

Young, S., et al., "Optimizing System Coordination and Overcurrent Protection With Zone Selective Interlocking," Textile, Fiber and Film Industry Technical Conference, IEEE, May 1990, pp. 9/1-9/6.

* cited by examiner

ZONE SELECTIVE INTERLOCKING (ZSI) POWER DISTRIBUTION OPERATING A ZSI POWER DISTRIBUTION SYSTEM

BACKGROUND

The present application relates generally to power systems and, more particularly, to zone selective interlocking (ZSI) power distribution systems and methods of operating and/or testing a ZSI power distribution system.

Known electrical distribution systems include a plurality of switchgear lineups including circuit breakers that are each coupled to one or more loads. The circuit breakers typically include a trip unit that controls the circuit breakers based upon sensed current flowing through the circuit breakers. More specifically, the trip unit causes current flowing through the circuit breaker to be interrupted if the current is outside of acceptable conditions.

For example, at least some known circuit breakers are programmed with one or more current thresholds (also known as "pickup" thresholds) that identify undesired current levels for the circuit breaker. If a fault draws current in excess of one or more current thresholds for a predetermined amount of time, for example, the trip unit typically activates the associated circuit breaker to stop current from flowing through the circuit breaker. However, in power distribution systems that include a plurality of circuit breakers, a typical arrangement uses a hierarchy of circuit breakers. Large circuit breakers (i.e., circuit breakers with a high current rating) are positioned closer to a power source than lower current feeder circuit breakers and feed the lower current feeder circuit breakers. Each feeder circuit breaker may feed a plurality of other circuit breakers, which connect to loads or other distribution equipment.

A fault may occur anywhere in the circuit breaker hierarchy. When a fault occurs, each circuit breaker that has the same fault current flowing through it may detect different amounts of fault current as a result of varying sensor sensitivities and/or tolerances. When the fault occurs, the circuit breaker closest to the fault should operate to stop current from flowing through the circuit breaker. If a circuit breaker higher in the hierarchy trips, multiple circuits or loads may unnecessarily lose service.

To accommodate for the varying tolerances and to ensure that multiple circuit breakers do not unnecessarily trip based on the same fault current, the current thresholds of at least some known circuit breakers are nested with each other to avoid overlapping fault current thresholds. In some other known systems, circuit breakers in a lower tier send coordination or blocking signals to higher tier circuit breakers upon detection of a fault current. The upper tier circuit breakers' operation is coordinated with the operation of the lower tier circuit breaker in response to the blocking signal.

BRIEF DESCRIPTION

In one aspect, a circuit protection device for a zone selective interlocking (ZSI) system includes a trip mechanism configured to interrupt a current flowing through the circuit protection device, and a trip unit operatively coupled to the trip mechanism. The trip unit is configured to receive a current rate of change signal and determine whether to output a blocking signal to a second circuit protection device based, at least in part, on the current rate of change signal. The current rate of change signal is proportional to a detected rate of change of the current flowing through said circuit protection device.

In another aspect, a zone selective interlocking (ZSI) power distribution system includes a first circuit protection device and a second circuit protection device coupled to the first circuit protection device downstream of the first circuit protection device. The second circuit protection device includes a trip mechanism configured to interrupt a current flowing through the second circuit protection device, a current rate of change sensor configured to detect a rate of change of the current flowing through the second circuit protection device and generate a current rate of change signal proportional to the detected rate of change of the current flowing through the second circuit protection device, and a trip unit operatively coupled to said trip mechanism. The trip unit is configured to receive the current rate of change signal from the current rate of change sensor and determine whether to output a blocking signal to the first circuit protection device based, at least in part, on the current rate of change signal.

In yet another aspect, a method of determining by a first circuit protection device in a zone selective interlocking (ZSI) system whether to output a blocking signal to a second circuit protection device in the ZSI system is described. The method includes detecting, by a current rate of change sensor, a rate of change of a current flowing through the first circuit protection device. A trip unit receives a current rate of change signal from the current rate of change sensor. The current rate of change signal is proportional to the detected rate of change of the current flowing through the first circuit protection device. The trip unit determines whether to output the blocking signal to the second circuit protection device based, at least in part, on the current rate of change signal.

DETAILED DESCRIPTION

Exemplary embodiments of power distribution systems and methods of operating a power distribution system are described herein. The exemplary power distribution systems include a plurality of circuit protection devices arranged in a plurality of tiers in a zone selective interlocking (ZSI) configuration. One or more downstream (e.g., in a lower tier) circuit protection devices are operable to output a blocking signal to one or more upstream (e.g., in a higher tier) circuit protection devices based, at least in part, on a detected (i.e., sensed) rate of change of current flowing through the circuit protection device. The circuit protection devices are thus able to anticipate current exceeding a protective threshold and may output a blocking signal before the current exceeds the threshold.

Figure 1:
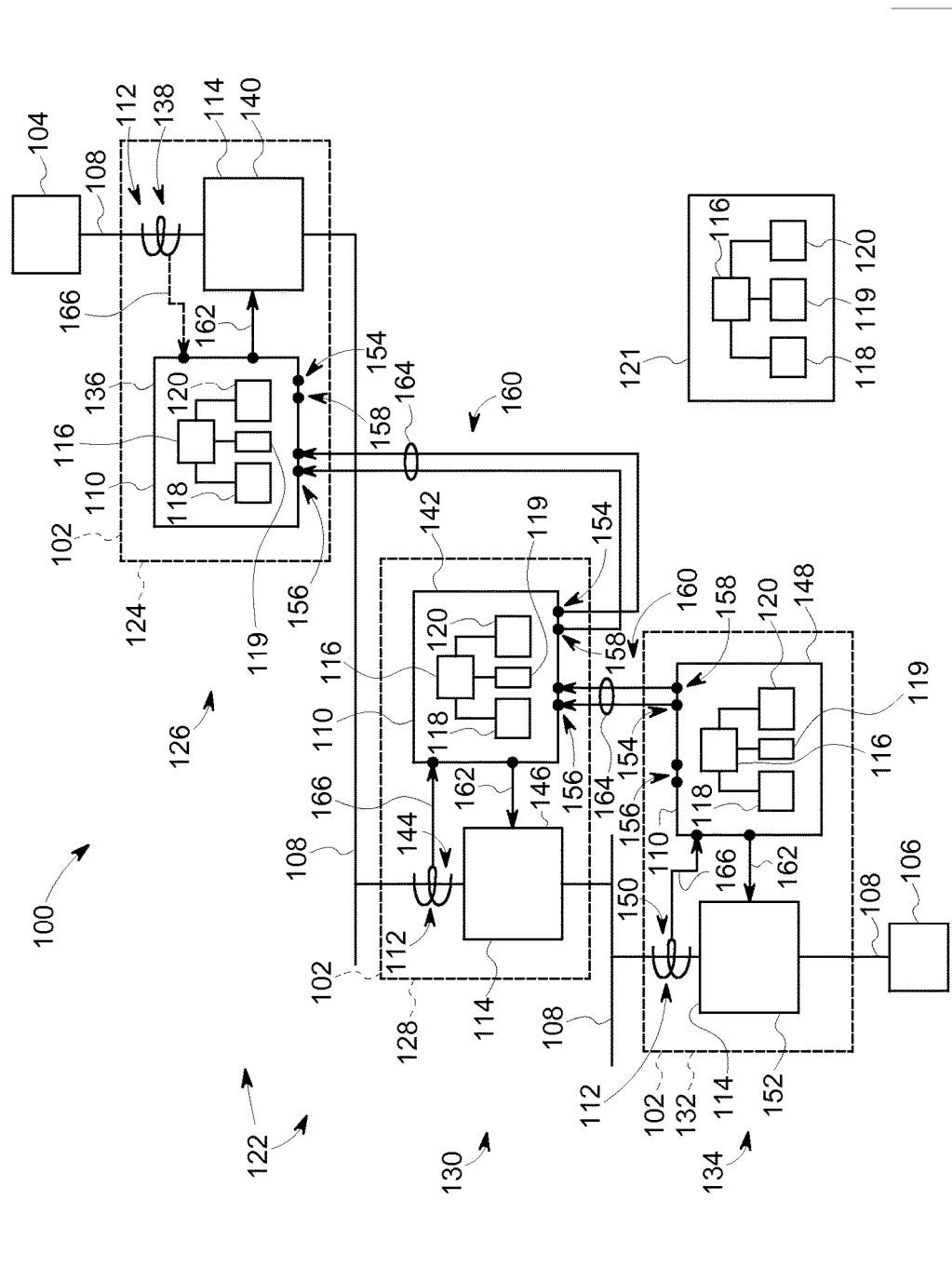
FIG. 1 is a schematic block diagram of an exemplary power distribution system.

FIG. 1 is a schematic block diagram of a portion of an exemplary ZSI power distribution system 100 illustrating a plurality of circuit protection devices 102.

Each circuit protection device 102 is configured to control a delivery of power from one or more electrical power sources 104 to one or more loads 106. Electrical power sources 104 may include, for example, one or more generators or other devices that provide electrical current (and resulting electrical power) to loads 106. The electrical current may be transmitted to loads 106 through one or more electrical distribution lines or busses 108 coupled to circuit protection devices 102. Loads 106 may include, but are not limited to only including, machinery, motors, lighting, and/or other electrical and mechanical equipment of a manufacturing or power generation or distribution facility.

In an exemplary embodiment, circuit protection device 102 is a circuit breaker. Alternatively, circuit protection device 102 may be any other device that enables power distribution system 100 to function as described herein. In an exemplary embodiment, each circuit protection device 102 includes a trip unit 110 operatively coupled to a sensor 112 and a trip mechanism 114. Trip unit 110, in an exemplary embodiment, is an electronic trip unit (ETU) that includes a processor 116 coupled to a memory 118, an input device 119, and a display device 120. Trip unit 110 may include, or be may be considered to be, a computing device. In other embodiments, trip units 110 may be any other suitable type of trip unit. In some embodiments, one or more of circuit protection devices 102 include a different type of trip unit 110 and/or is a different type of circuit protection device than at least one other of circuit protection devices 102.

Sensor 112 is a sensor that measures a rate of change of current flowing through trip mechanism 114 and/or circuit protection device 102. In an example embodiment, sensor 112 is a Rogowski coil. Alternatively, sensor 112 may include any other sensor that enables power distribution system 100 to function as described herein. In an exemplary embodiment, each sensor 112 generates a signal representative of the measured or detected rate of change of current (hereinafter referred to as "current rate of change signal") flowing through an associated trip mechanism 114 and/or circuit protection device 102. In addition, each sensor 112 transmits the current rate of change signal to processor 116 associated with, or coupled to, trip mechanism 114. Each processor 116 is programmed to integrate its current rate of change signal to determine an amount of current flowing through the associated trip mechanism 114. Alternatively, the current rate of change signal may be integrated using analog integrators and/or any other analog and/or digital circuit suitable for integration of the current rate of change signal. Each processor 116 is programmed to activate trip mechanism 114 to interrupt a current provided to a load 106 or an electrical distribution line or bus 108 if the integrated current rate of change signal, and/or the current represented by the integrated current rate of change signal, exceeds a current threshold.

Trip mechanism 114 includes, for example, one or more circuit breaker devices and/or arc containment devices. Exemplary circuit breaker devices include, for example, circuit switches, contact arms, and/or circuit interrupters that interrupt current flowing through the circuit breaker device to a load 106 coupled to the circuit breaker device.

Each processor 116 controls the operation of a circuit protection device 102 and gathers measured operating condition data, such as the current rate of change from sensor 112 associated with trip mechanism 114 coupled to processor 116. Processor 116 stores the data in a memory 118 coupled to processor 116. It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor."

Memory 118 additionally stores program code and instructions, executable by processor 116, to control circuit protection device 102. Memory 118 may include, but is not limited to only include, non-volatile RAM (NVRAM), magnetic RAM (MRAM), ferroelectric RAM (FeRAM), read only memory (ROM), flash memory and/or Electrically Erasable Programmable Read Only Memory (EEPROM). Any other suitable magnetic, optical and/or semiconductor memory, by itself or in combination with other forms of memory, may be included in memory 118. Memory 118 may also be, or include, a detachable or removable memory, including, but not limited to, a suitable cartridge, disk, CD ROM, DVD or USB memory.

Input device 119 receives input from, for example, a user, another trip unit 110, a remote computing device, etc. Input device 119 may include, for example, a keyboard, a card reader (e.g., a smartcard reader), a pointing device, a mouse, a stylus, a touch sensitive panel (e.g., a touch pad or a touch screen), a gyroscope, an accelerometer, a position detector, a keypad, one or more buttons, and/or an audio input interface. A single component, such as a touch screen, may function as both display device 120 and input device 119. In some embodiments, input device 119 may include a communication interface to receive input from a remote computing device (including from another trip unit 110). Although a single input device 119 is shown for each trip unit 110, a trip unit 110 may include more than one input device 119.

Display device 120 visually presents information about circuit protection device 102 and/or trip mechanism 114. Display devices 120 may include a vacuum fluorescent display (VFD), one or more light-emitting diodes (LEDs), liquid crystal displays (LCDs), cathode ray tubes (CRT), plasma displays, and/or any suitable visual output device capable of visually conveying information to a user. For example, processor 116 may activate one or more components of display device 120 to indicate that circuit protection device 102 and/or trip mechanism 114 is active and/or operating normally, is receiving a blocking signal, is transmitting a blocking signal, that a fault or failure has occurred, and/or any other status of trip mechanism 114 and/or circuit protection device 102. In some embodiments, display device 120 presents a graphical user interface (GUI) to a user for interaction between the user and circuit protection device 102. The GUI permits the user, for example, to control circuit protection device 102, monitor operation/status of circuit protection device 102, test operation of circuit protection device 102, and/or modify operational parameters of circuit protection device 102.

In an exemplary embodiment, power distribution system 100 includes a remote computing device 121. Remote computing device 121 is remote in that it is not incorporated within one of the circuit protection devices 102, but may be located near other components of power distribution system 100. Remote computing device 121 includes processor 116 coupled to memory 118, input device 119, and display device 120. Remote computing device 121 is communicatively coupled to one or more of circuit protection devices 102. Remote computing device 121 may be directly connected to one or more circuit protection devices 102 and/or may be coupled to one or more circuit protection devices 102 via a network, including the Internet. The communicative coupling between remote computing device 121 and circuit protection device(s) 102 may be a wired connection or a wireless connection using any suitable wired and/or wireless communication protocols. In other embodiments, power distribution system 100 does not include remote computing device.

In an exemplary embodiment, circuit protection devices 102 are arranged in a hierarchy including a plurality of tiers 122, or circuit branches, to provide different levels of protection and monitoring to power distribution system 100. For example, in one embodiment, a first circuit protection device 124 is arranged in a first, or upstream, tier 126 to receive current from electrical power source 104. A second circuit protection device 128 is arranged in a second, or intermediate, tier 130 that is downstream of first circuit protection device 124. A third circuit protection device 132 is arranged in a third, or downstream, tier 134 that is downstream of second circuit protection device 128. Third circuit protection device 132 provides current received from electrical power source 104 (through first circuit protection device 124 and second circuit protection device 128) to load 106.

As used herein, the term "downstream" refers to a direction of power flow, for example, from electrical power source 104 towards load 106. The term "upstream" refers to a direction of current flow, for example, from load 106 towards electrical power source 104.

Moreover, first circuit protection device 124 includes a first trip unit 136, a first sensor 138, and a first trip mechanism 140, second circuit protection device 128 includes a second trip unit 142, a second sensor 144, and a second trip mechanism 146, and third circuit protection device 132 includes a third trip unit 148, a third sensor 150, and a third trip mechanism 152.

While FIG. 1 illustrates three circuit protection devices 102 arranged in three tiers 122, it should be recognized that any suitable number of circuit protection devices 102 may be arranged in any suitable number of tiers 122 to enable power distribution system 100 to function as described herein. For example, it should be recognized that one or more additional tiers 122 and/or circuit protection devices 102 may be disposed between electrical power source 104 and first circuit protection device 124 and/or first tier 126 in some embodiments. Additionally or alternatively, one or more additional tiers 122 and/or circuit protection devices 102 may be disposed between load 106 and third circuit protection device 132 in some embodiments.

As illustrated in FIG. 1, each trip unit 110 includes a plurality of ports 154 that receive signals from, and transmit signals to, other trip units 110. In an exemplary embodiment, ports 154 include at least one blocking signal input port 156 and at least one blocking signal output port 158. Blocking signal input port 156 and blocking signal output port 158 transmit one or more blocking signals 160 between circuit protection devices 102. Each trip unit's ports 154 may be physically separate ports 154 or may be a single physical port providing one or more virtual ports (e.g., ports 156 and 158).

In an exemplary embodiment, blocking signal 160 is generated by each trip unit 110 when a positive rate of change of current detected by sensor 112 (e.g., the current rate of change signal) exceeds a blocking threshold defined for an associated trip mechanism 114. In addition, blocking signal 160 is transmitted, or forwarded, to an upstream trip unit 110 if blocking signal 160 is received from a downstream trip unit 110. For example, blocking signal 160 of second trip unit 142 is transmitted to upstream trip unit 110 (e.g., first trip unit 136) if second trip unit 142 received blocking signal 160 from third trip unit 148 and/or if second trip unit 142 detected a current above the blocking threshold. In response to receiving blocking signal 160, first trip unit 136 may shift from an unrestrained mode of operation to a restrained mode of operation, to prevent first trip unit 136 and second trip unit 142 from operating at similar trip timing sequences. Additionally or alternatively, first trip unit 136 may switch to operating at, or using, a higher trip threshold, such as switching from a protective threshold to a backup threshold, in response to receiving blocking signal 160.

In the unrestrained mode of operation, an unrestrained trip timing sequence may be executed that includes accumulating time values in which the current exceeds the protective threshold until an unrestrained time threshold is reached. In the restrained mode of operation, a restrained trip timing sequence may be executed that includes accumulating time values in which the current exceeds the backup threshold until a restrained time threshold is reached. If the restrained time threshold or the unrestrained time threshold is reached, trip unit 110 generates trip signal 162. Alternatively, the unrestrained trip timing sequence and the restrained trip timing sequence may include any other actions or responses that enable trip units 110 to function as described herein. It should be recognized that the unrestrained trip timing sequence causes trip signal 162 to be generated in a period of time that is shorter than a period of time in which the restrained trip timing sequence causes trip signal 162 to be generated.

Ports 154 of a trip unit 110 are coupled to ports 154 of other trip units 110 by one or more conductors 164. In an exemplary embodiment, each port 154 includes a positive terminal and a negative terminal for coupling to conductors 164 carrying positive and negative signals, respectively. For example, conductors 164 transmit positive and negative components of blocking signals 160 to the positive and negative terminals of ports 154. Alternatively, ports 154 may receive any suitable signal and/or may include any suitable number of terminals that enables trip units 110 to function as described herein. It should be recognized that signals of the same polarity may be used instead of signals of positive and negative polarity. For example, a "positive" signal may be a signal that has an amplitude that is higher than an amplitude of a "negative" signal.

In an exemplary embodiment, blocking signal output port 158 of trip unit 110 (e.g., second trip unit 142) is coupled to blocking signal input port 156 of upstream trip unit 110 (e.g., first trip unit 136). In a specific embodiment, a single circuit protection device 102 is positioned at the next tier upstream of the referenced circuit protection device 102 (and the associated trip unit 110) such that blocking signal output port 158 of the referenced trip unit 110 is coupled to blocking signal input port 156 of the upstream trip unit 110 by at least one conductor 164. In addition, blocking signal input port 156 of the referenced trip unit 110 (e.g., second trip unit 142) is coupled to blocking signal output port 158 of one or more downstream trip units 110 (e.g., third trip unit 148) by at least one conductor 164.

Each circuit protection device 102 (and each associated trip unit 110) is configured as described above such that trip units 110 receive one or more blocking signals 160 from downstream trip units 110 through blocking signal input port 156 and transmit one or more blocking signals 160 to upstream trip units 110 through blocking signal output port 158. In an exemplary embodiment, blocking signals 160 received from a downstream trip unit 110 are automatically forwarded on to upstream trip units 110. For example, if second trip unit 142 receives blocking signal 160 from third trip unit 148, second trip unit 142 transmits blocking signal 160 to first trip unit 136.

In addition, sensor 112 measures a rate of change of current (i.e., di/dt) flowing through trip mechanism 114 (e.g., through electrical distribution bus 108 that is coupled to trip mechanism 114). Sensor 112 generates a current rate of change signal 166 representative of the measured or detected rate of change of current flowing through trip mechanism 114, and transmits current rate of change signal 166 to trip unit 110. Trip unit 110 is programmed to calculate the current flowing through trip mechanism 114 based on the current rate of change signal (e.g., by integrating the current rate of change signal) and to activate trip mechanism 114 based on the calculated current exceeding a trip threshold by transmitting trip signal 162 to trip mechanism 114, thus causing trip mechanism 114 to interrupt the current flowing therethrough as described above.

Generally, if a fault occurs in the zone protected by second circuit protection device 128, for example, second sensor 144 detects the rate of change of current (including a fault current) flowing through electrical distribution bus 108. Second sensor 144 transmits current rate of change signal 166 (which is proportional to the rate of change of the current) to second trip unit 142, and second trip unit 142 compares the current rate of change signal 166 to one or more current rate of change thresholds of second trip unit 142, such as the blocking threshold. A rate of change threshold is a threshold value that corresponds to a threshold rate of change of the current measured by sensor 144. Second trip unit 142 also calculates the total current sensed by second sensor 142 by integrating the current rate of change signal 166 and compares the resulting calculated current to one or more predetermined current thresholds of second trip unit 142, such as a protective threshold.

If the rate of change of current exceeds the blocking threshold, second trip unit 142 transmits blocking signal 160 to first trip unit 136. In addition, if the calculated total current exceeds the protective threshold, second trip unit 142 may begin the process to issue a trip signal to interrupt the current. In contrast, if the detected rate of change of current exceeds the blocking threshold, but the calculated total current does not exceed the protective threshold, second trip unit 142 transmits blocking signal 160 to first trip unit 136 but does not send a trip signal to trip mechanism 114. Upon the receipt of blocking signal 160, first trip unit 136 switches to operating in the restrained mode of operation. The time required for the calculated total current to exceed the protective threshold will generally be greater than the time needed for the rate of change threshold to be exceeded. Therefore, the detected rate of change of the current may be used for blocking, while still allowing time for the comparison of the calculated total current to the protective threshold to be blocked.

First trip unit 136 and third trip unit 148 operate similarly as second trip unit 142. Accordingly, first trip unit 136 and third trip unit 148 compare detected rates of change of current and/or calculated total currents with one or more predetermined current thresholds, such as the blocking threshold, the protective threshold, and/or the backup threshold. In a similar manner as described above, first trip unit 136 and third trip unit 148 initiate trip timing sequences if the protective threshold or the backup threshold is exceeded, and generate blocking signal 160 if the blocking threshold is exceeded. First trip unit 136 and third trip unit 148 transmit blocking signals 160 to upstream trip units 110 (if present) if the blocking threshold is exceeded.

Figure 2:
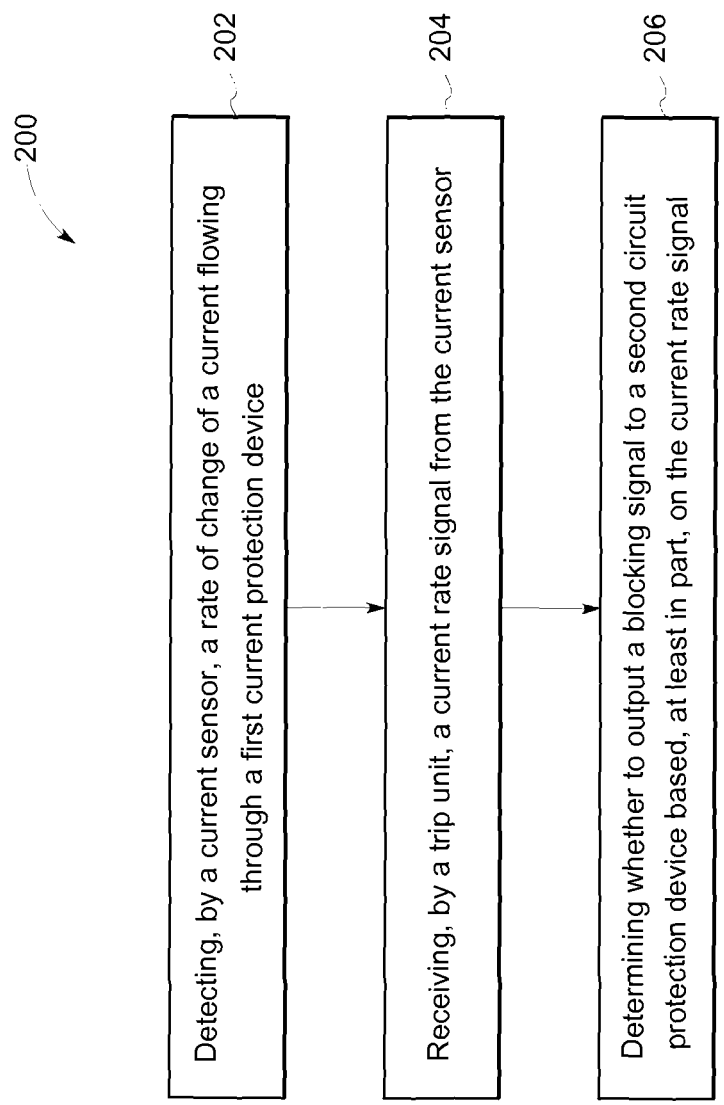
FIG. 2 is a flow diagram of an exemplary method of operating a power distribution system, such as the power distribution system shown in FIG. 1.

FIG. 2 is a flow diagram of an exemplary method 200 of determining by a first circuit protection device in a zone selective interlocking (ZSI) system, such as power distribution system 100 (shown in FIG. 1), whether to output a blocking signal to a second circuit protection device in the ZSI system. In an exemplary embodiment, method 200 is executed by one or more circuit protection device 102. More particularly, some or all of method 200 is executed by processor 116 of one or more of trip units 110. In an exemplary embodiment, a plurality of computer-executable instructions is embodied within a computer-readable medium, such as memory 118 (shown in FIG. 1). The instructions, when executed by the processor, cause the processor to execute the steps of method 200 and/or to function as described herein. The first and second circuit protection devices may be any two circuit protection device in system 100 that share the appropriate upstream/downstream relationship. For explanatory purposes, method 200 will described with reference to circuit protection device 124 and circuit protection device 128.

Method 200 includes detecting 202, by a current rate of change sensor, a rate of change of a current flowing through the first circuit protection device. In the example embodiment, current rate of change sensor 144 detects the rate of change of current flowing through circuit protection device 128. Trip unit 142 receives 204 a current rate of change signal from current rate of change sensor 144. The current rate of change signal is a signal proportional to the detected rate of change of the current flowing through circuit protection device 128.

At 206, circuit protection device 128, and more particularly trip unit 142, determines whether or not to output a blocking signal to circuit protection device 124 based, at least in part, on the received current rate of change signal. In some embodiments, circuit protection device 128 determines whether to output the blocking signal to circuit protection device 124 by comparing the current rate of change signal to a predetermined threshold rate of change. If the current rate of change signal exceeds the predetermined threshold rate of change, circuit protection device 128 outputs the blocking signal to circuit protection device 128. The predetermined threshold rate of change may have any suitable value that indicates that the current through circuit protection device 124 is increasing at a rate indicating the current may exceed a protection threshold.

In some embodiments, circuit protection device 128 determines whether to output the blocking signal to circuit protection device 124 based on the current rate of change signal and one or more additional factors. In an exemplary embodiment, the decision is based on the current rate of change signal and a magnitude of the current flowing through circuit protection device 128. Alternatively, any other suitable factors, such as a voltage magnitude, may be combined with the current rate of change signal as the basis for the determination. As described above, the magnitude of the current may be determined by integrating the current rate of change signal over time. Alternatively, an additional sensor (not shown) may detect the magnitude of the current flowing through circuit protection device 128. In one example embodiment, the current rate of change signal is compared to a predetermined threshold rate of change and the magnitude of the current is compared to a predetermined current threshold. If the current rate of change signal exceeds the threshold rate of change and the magnitude of the current exceeds the current threshold, circuit protection device 128 issues a blocking signal to circuit protection device 124. In other embodiments, the current rate of change signal is combined with one or more additional factors using any suitable combinational logic.

In an example embodiment, circuit protection device 128 determines to output the blocking signal to circuit protection device 124 when the current rate of change signal exceeds a determined threshold rate of change that is determined as a function of the magnitude of the current flowing through the circuit protection device. Thus, for example, the determined threshold rate of change may vary as the current flowing through circuit protection device 128 varies. In some embodiments, the determined threshold rate of change decreases as the current through circuit protection device 128 increases. Thus, when the current through circuit protection device 128 is high, a lower rate of increase in the current may trigger the output of a blocking signal. Conversely, at lower current levels, a higher rate of increase may be needed before a blocking signal is output by circuit protection device 128. In some embodiments, a predetermined time constant is used to determine the threshold rate of change in combination with the current through the circuit protection device. The predetermined time constant is a threshold amount of time (sometimes referred to as a filter) that it will take for the current through the circuit protection device to increase to a protection threshold (at which a trip may occur). For any given current through circuit protection device 128, the rate of change threshold may be the rate of change that will increase the current to the protection threshold in the predetermined time constant. If the rate of change signal exceeds the determined rate of change threshold, the current will increase above the protection threshold in less time than the predetermined time constant (if the rate of change stays constant or increases), and circuit protection device 128 outputs a blocking signal to circuit protection device 124. In other embodiments, any other suitable relationship between the current rate of change signal and the current through circuit protection device 128 may be defined.

A technical effect of the methods and systems described herein may include one or more of: (a) detecting, by a current rate of change sensor, a rate of change of a current flowing through the first circuit protection device; (b) receiving, by a trip unit, a current rate of change signal proportional to the detected rate of change of the current from the current rate of change sensor; and (c) determining whether to output a blocking signal to a second circuit protection device based, at least in part, on the current rate of change signal.

Exemplary embodiments of power distribution systems and methods of operating a power distribution system are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the power system as described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A circuit protection device for a zone selective interlocking (ZSI) system comprising:
    a trip mechanism configured to interrupt a current flowing through said circuit protection device; and
    a trip unit operatively coupled to said trip mechanism, said trip unit configured to:
        receive a current rate of change signal, the current rate of change signal being proportional to a detected rate of change of the current flowing through said circuit protection device; and
        determine whether to output a blocking signal to a second circuit protection device based, at least in part, on whether the current rate of change signal exceeds a threshold rate of change.

2. A circuit protection device in accordance with claim 1, further comprising a current rate of change sensor configured to detect the rate of change of the current flowing through said circuit protection device and generate the current rate of change signal proportional to the detected rate of change of the current flowing through said circuit protection device.

3. A circuit protection device in accordance with claim 2, wherein said current rate of change sensor comprises a Rogowski coil.

4. A circuit protection device in accordance with claim 1, wherein said trip unit is configured to compare the current rate of change signal to the threshold rate of change.

5. A circuit protection device in accordance with claim 1, wherein said trip unit is configured to determine to output a blocking signal to a second circuit protection device based on the current rate of change signal and a magnitude of the current flowing through the circuit protection device.

6. A circuit protection device in accordance with claim 5, wherein said trip unit is configured to determine the magnitude of current flowing through the circuit protection device.

7. A circuit protection device in accordance with claim 6, wherein said trip unit is configured to determine the magnitude of current flowing through the circuit protection device by integrating the current rate of change signal.

8. A circuit protection device in accordance with claim 5, wherein the threshold rate of change is a predetermined threshold rate of change, and said trip unit is configured to determine to output a blocking signal to a second circuit protection device when the current rate of change signal exceeds the predetermined threshold rate of change and the magnitude of the current flowing through the circuit protection device exceeds a predetermined current threshold.

9. A circuit protection device in accordance with claim 5, wherein the threshold rate of change is a determined threshold rate of change determined as a function of the magnitude of the current flowing through the circuit protection device, and said trip unit is configured to determine to output a blocking signal to a second circuit protection device when the current rate of change signal exceeds the determined threshold rate of change.

10. A zone selective interlocking (ZSI) power distribution system comprising:
   a first circuit protection device; and
   a second circuit protection device coupled to said first circuit protection device downstream of said first circuit protection device, said second circuit protection device comprising:
      a trip mechanism configured to interrupt a current flowing through said second circuit protection device;
      a current rate of change sensor configured to detect a rate of change of the current flowing through said second circuit protection device and generate a current rate of change signal proportional to the detected rate of change of the current flowing through said second circuit protection device; and
      a trip unit operatively coupled to said trip mechanism, said trip unit configured to:
         receive the current rate of change signal from said current rate of change sensor; and
         determine whether to output a blocking signal to said first circuit protection device based, at least in part, on whether the current rate of change signal exceeds a threshold rate of change.

11. A ZSI power distribution system in accordance with claim 10, wherein said second circuit protection device trip unit is configured to compare the current rate of change signal to the threshold rate of change.

12. A ZSI power distribution system in accordance with claim 10, wherein said second circuit protection device trip unit is configured to determine to output a blocking signal to said first circuit protection device based on the current rate of change signal and a magnitude of the current flowing through said second circuit protection device.

13. A ZSI power distribution system in accordance with claim 12, wherein said second circuit protection device trip unit is configured to determine the magnitude of current flowing through said second circuit protection device by integrating the current rate of change signal.

14. A ZSI power distribution system in accordance with claim 12, wherein the threshold rate of change is a determined threshold rate of change determined as a function of the magnitude of the current flowing through said second circuit protection device, and said second circuit protection device trip unit is configured to determine to output a blocking signal to said first circuit protection device when the current rate of change signal exceeds the determined threshold rate of change.

15. A ZSI power distribution system in accordance with claim 12, wherein the threshold rate of change is a predetermined threshold rate of change, and said second circuit protection device trip unit is configured to determine to output a blocking signal to said first circuit protection device when the current rate of change signal exceeds the predetermined threshold rate of change and the magnitude of the current flowing through said second circuit protection device exceeds a predetermined current threshold.

16. A method of determining by a first circuit protection device in a zone selective interlocking (ZSI) system whether to output a blocking signal to a second circuit protection device in the ZSI system, said method comprising:
   detecting, by a current rate of change sensor, a rate of change of a current flowing through the first circuit protection device;
   receiving, by a trip unit, a current rate of change signal from the current rate of change sensor, the current rate of change signal being proportional to the detected rate of change of the current flowing through the first circuit protection device; and
   determining whether to output the blocking signal to the second circuit protection device based, at least in part, on whether the current rate of change signal exceeds a threshold rate of change.

17. A method in accordance with claim 16, wherein determining whether to output the blocking signal to the second circuit protection device comprises determining to output the blocking signal to the second circuit protection device when the current rate of change signal exceeds a predetermined threshold rate of change.

18. A method in accordance with claim 16, further comprising determining, by the trip unit, a magnitude of the current flowing through the circuit protection device, and wherein determining whether to output the blocking signal to the second circuit protection device comprises determining whether to output the blocking signal to the second circuit protection device based on the current rate of change signal and the determined magnitude of the current flowing through the first circuit protection device.

19. A method in accordance with claim 18, wherein the threshold rate of change is a predetermined threshold rate of change, and determining whether to output the blocking signal to the second circuit protection device based on the current rate of change signal and the determined magnitude of the current flowing through the first circuit protection device comprises determining to output the blocking signal to the second circuit protection device when the current rate of change signal exceeds the predetermined threshold rate of change and the magnitude of the current flowing through the first circuit protection device exceeds a predetermined current threshold.

20. A method in accordance with claim 18, wherein the threshold rate of change is a determined threshold rate of change determined as a function of the magnitude of the current flowing through the first second circuit protection device, and determining whether to output the blocking signal to the second circuit protection device based on the current rate of change signal and the determined magnitude of the current flowing through the first circuit protection device comprises determining to output the blocking signal to the second circuit protection device when the current rate of change signal exceeds the determined threshold rate of change.

* * * * *